United States Patent
Gauthier et al.

(10) Patent No.: US 6,297,789 B2
(45) Date of Patent: Oct. 2, 2001

(54) INTEGRATED CIRCUIT CARD WITH LIQUID CRYSTAL DISPLAY FOR VIEWING AT LEAST A PORTION OF THE INFORMATION STORED IN THE CARD

(75) Inventors: Dominique Gauthier, Levallois-Perret (FR); Mark R. Munch, Palo Alto, CA (US); Akira Tomita, Redwood City, CA (US); John L. Goodell, Sunnyvale, CA (US); Gilles Gozlan, Le Mesnil Theribus (FR)

(73) Assignee: Tyco Electronics Corporation, Middletown, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/112,497

(22) Filed: Jul. 9, 1998

(51) Int. Cl.[7] ........................................ G09G 3/36
(52) U.S. Cl. ........................ 345/87; 345/211; 345/38; 235/380; 361/683
(58) Field of Search .................. 345/87, 211, 50, 345/52, 34–38; 235/492, 380, 440–441, 432; 348/13; 361/683; 365/108; 429/66, 3, 7; 380/23

(56) References Cited

U.S. PATENT DOCUMENTS

| | | | |
|---|---|---|---|
| 4,435,047 | 3/1984 | Fergason | 349/86 |
| 4,685,771 | 8/1987 | West et al. | 349/94 |
| 4,748,366 | 5/1988 | Taylor | 310/328 |
| 4,918,631 | 4/1990 | Hara et al. | 361/683 |
| 4,954,985 * | 9/1990 | Yamazaki | 365/108 |
| 4,992,201 | 2/1991 | Pearlman | 252/299 |
| 5,072,103 * | 12/1991 | Nara | 235/492 |
| 5,202,063 | 4/1993 | Andrews et al. | 264/4.6 |
| 5,233,445 | 8/1993 | Kamath et al. | 349/86 |
| 5,267,218 | 11/1993 | Elbert | 365/185 |
| 5,293,424 * | 3/1994 | Holtey et al. | 380/23 |
| 5,328,580 | 7/1994 | Reamey | 204/484 |
| 5,405,551 | 4/1995 | Reamey et al. | 252/299 |

(List continued on next page.)

FOREIGN PATENT DOCUMENTS

| | | | |
|---|---|---|---|
| 0 291 259 A1 | 11/1988 | (EP) | G07F/7/10 |
| 0313053 A2 | 4/1989 | (EP) | G02F/1/133 |
| 2743021 | 7/1997 | (FR) | B45D/15/10 |
| 7-329461 | 12/1995 | (JP) | B45D/15/10 |
| WO 94/20929 | 9/1994 | (WO) | G06K/19/07 |
| WO96/19547 | 6/1996 | (WO) | C09K/19/54 |

OTHER PUBLICATIONS

Microchip Technology, Inc., brochure entitled "28C16A 16K (2Kx8) CMOS EEPROM," pp. 1–8 (Sep. 1996).

Murata Manufacturing Co., Ltd., brochure entitled "Piezoelectric Sound Components" (1997).

Xicor, Inc. brochure entitled "X84041 Micro Port Saver $E^2PROM$," pp. 1–4 (Jun. 1996).

*Primary Examiner*—Richard Hjerpe
*Assistant Examiner*—Frances Nguyen

(57) ABSTRACT

An integrated circuit card contains a liquid crystal display for displaying at least a portion of the information stored therein. The displayed information is stored in a first, or reserved, memory. A second, or additional, memory is used to store further information. The use of a reserved memory for storing the displayed information permits the use of very low power electrical energy sources for driving the display and the electronics controlling the pixels of the display, such as piezoelectric sources, pyroelectric sources, photovoltaic cells, and very small batteries. The first and second memories may be integrated into a single IC chip, or they may be separate components.

26 Claims, 1 Drawing Sheet

U.S. PATENT DOCUMENTS

Figure 1:
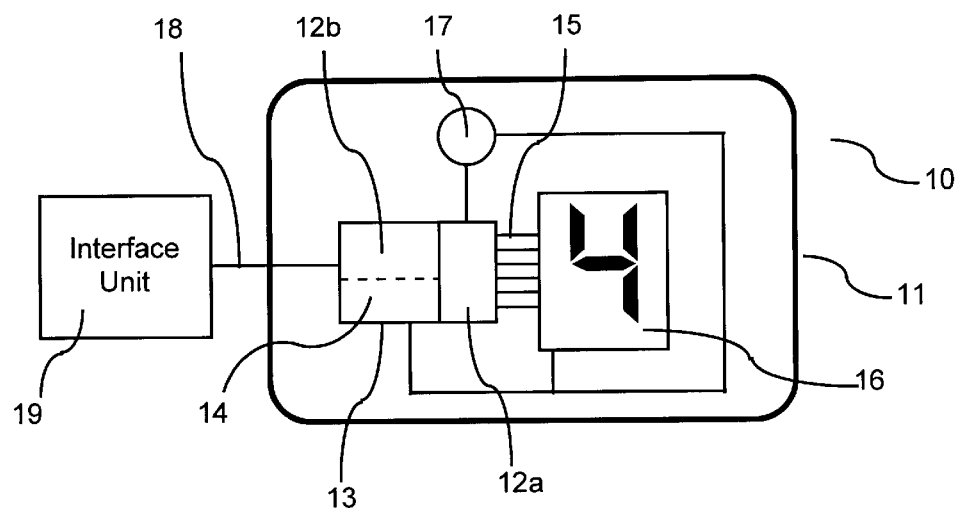

| | | | |
|---|---|---|---|
| 5,427,713 | 6/1995 | Wartenberg | 252/299 |
| 5,543,944 | 8/1996 | Reamey et al. | 349/89 |
| 5,550,361 | 8/1996 | Huis et al. | 235/440 |
| 5,566,982 | 10/1996 | Lehureau et al. | 283/83 |
| 5,574,270 | 11/1996 | Steffen | 235/441 |
| 5,585,947 | 12/1996 | Havens et al. | 349/92 |
| 5,594,493 | 1/1997 | Nemirofsky | 348/13 |
| 5,623,637 | 4/1997 | Jones et al. | 711/164 |
| 5,640,306 | 6/1997 | Gaumet et al. | 361/737 |
| 5,682,027 * | 10/1997 | Bertina et al. | 235/380 |
| 5,682,031 | 10/1997 | Geronimi | 235/492 |
| 5,724,545 | 3/1998 | Skorski | 711/115 |
| 5,728,998 | 3/1998 | Novis et al | 235/380 |
| 5,729,004 | 3/1998 | Kim et al. | 235/492 |
| 5,734,151 | 3/1998 | Vandenengel | 235/441 |
| 5,734,154 | 3/1998 | Jachimowicz et al. | 235/492 |
| 5,738,804 | 4/1998 | Cao et al. | 252/299 |
| 5,752,857 | 5/1998 | Knights | 439/638 |
| 5,763,869 | 6/1998 | Moll et al. | 235/487 |
| 6,019,284 * | 2/2000 | Freeman et al. | 235/380 |

* cited by examiner

INTEGRATED CIRCUIT CARD WITH LIQUID CRYSTAL DISPLAY FOR VIEWING AT LEAST A PORTION OF THE INFORMATION STORED IN THE CARD

BACKGROUND OF THE INVENTION

1. Field of the Invention

This invention relates to an integrated circuit card having a liquid crystal display for viewing at least a portion of the information stored therein.

2. Description of Related Art

Integrated circuit (IC) cards are finding increasing popularity as compact, highly portable information storage articles. Also known as smart cards or chip cards, IC cards typically are credit card sized and contain an integrated circuit element that provides electronic data storage and/or logic function capability. Information stored on an IC card can be widely ranging, from financial to medical to personal identification information. Additionally, IC cards usually contain input/output connections for connection to an external control device that retrieves, updates, and/or displays the stored information.

A drawback with most IC cards is that the stored information is not immediately viewable by the bearer. While the IC card may contain information on the bearer's bank account balance, the bearer may not be able to see conveniently what is that balance. One solution has been to provide a separate IC card reader that "reads" the stored information and displays it. But such a solution has the limitation of requiring an additional component that may not be immediately accessible or readily portable, for example requiring the bearer to go to the nearest bank branch or ATM machine or to remember to bring the reader along on a trip.

Some constructions in which a display is integrated into an IC card have been proposed, such as Jachimowicz et al., U.S. Pat. No. 5,734,154 (1998) entitled "Smart Card With Integrated Reader And Visual Image Display." As IC cards increase in popularity and find applications in more and more areas of daily life, bearer access to the stored information becomes increasingly important. At the same time, their ubiquitousness means that IC cards are approaching commodity item status, meant to be disposed of after a finite number of uses, imposing strong economic pressure reduce their cost. Further, size, weight, and ruggedness permitting an IC card to be carried around in a wallet is an important consideration. Lastly, due to its limited size and thickness, an IC card offers limited electrical power storage (or generation) capability, so that the power consumption of a display and the electronics associated with it must be low enough.

BRIEF SUMMARY OF THE INVENTION

Thus, it is an object of this invention provides an IC card having an integrated display for viewing at least a portion of the information stored therein, where the display and associated electronics have low power consumption. Another object of this invention is to provide an IC card capable of displaying such stored information autonomously. An IC card of this invention preferably comprises a display employing a liquid crystal composite (as described further hereinbelow) as electro-optically active material, such material being especially adaptable for use in combination with plastic substrates and leading to a flexible and rugged IC card. These and other objects are achieved by an integrated circuit card according to this invention, comprising:

a. a card-shaped support;

b. a reprogrammable nonvolatile first memory on the support, for storing information to be displayed;

c. an integrated circuit chip on the support, comprising
   i. a reprogrammable nonvolatile second memory for storing additional information; and
   ii. a serial port on said support for interfacing the integrated circuit chip with an external controller device; and d. a liquid crystal display on the support, the liquid crystal display having plural pixels wherein, when the liquid crystal display is driven, the optical state of each pixel is determined by the state of a corresponding bit of information stored in the first memory;

e. plural parallel output ports connecting each pixel of the liquid crystal display to the corresponding bit of information stored in the first memory; and f. an electric energy source on the support, for driving the first memory and the liquid crystal display, the electrical energy source driving the first memory without affecting information stored in the second memory.

BRIEF DESCRIPTION OF THE DRAWING(S)

FIG. 1 shows schematically an IC card of this invention.

Figure 2A:
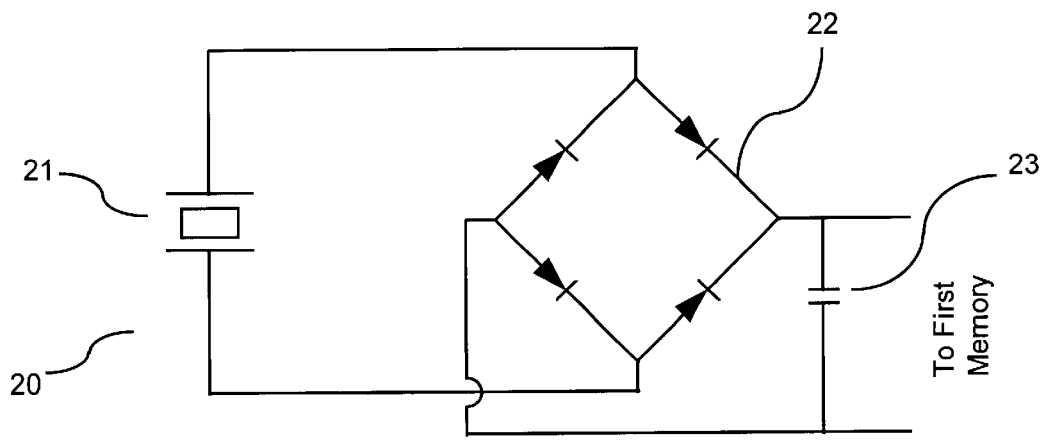
Figure 2B:
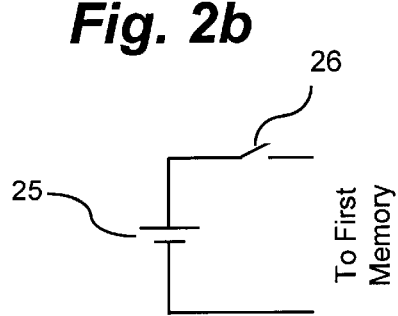
Figure 2C:
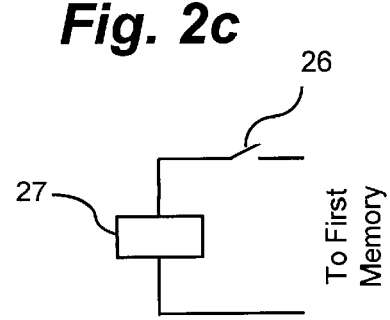

FIGS. 2a, 2b, and 2c show electric energy sources for an IC card of this invention.

Reference numerals repeated from one figure to another denote the same or like elements.

DETAILED DESCRIPTION OF THE INVENTION

An integrated circuit (IC) card 10 of this invention is shown in FIG. 1, which is typically credit card sized, although its size is not especially critical and it may be somewhat larger or smaller. Preferably, IC card 10 is less than 100 mm wide (more preferably less than 90 mm wide), less than 70 mm high (more preferably less than 60 mm high), and less than 2 mm (more preferably less than 1 mm) thick. Typical ISO dimensions for an IC card are 85.5×54× 0.76 mm. IC card 10 comprises a card shaped support 11 on which the other elements of IC card 10 are supported, for example by being partially or wholly embedded therein or by being surface mounted thereon. Support 11 may be made of flexible plastic, for example by molding or lamination.

On support 11 is a reprogrammable nonvolatile first memory 12a, which may be, for example, an EEPROM (electrically erasable programmable read-only memory) or a flash memory. Also on support 11 is an IC chip 13 including a reprogrammable nonvolatile second memory 12b. IC chip 13 is not restricted to being a memory-only chip; it may additionally have ptional logic circuits 14 for performing calculations on the stored data. First memory 12a is a reserved memory, for storing the information to be displayed by IC card 10. If IC card 10 is used, by way of illustration, for a bank account, the information in first memory 12a may be key information such as the account balance. Second memory 12b, normally larger in size than first memory 12a, may store additional, less key information (such as, continuing the illustration, recent deposits and withdrawals, interest earned, etc.). The information stored in first memory 12a may be redundantly stored in second memory 12b, or the information stored in first and second memories 12a, 12b may be non-overlapping, i.e., mutually exclusive. IC chip 13 includes a serial input/output (I/O) port 18 for communicating with an external interface unit 19 (also known in the art as a card reader/writer), for updating the information stored in first and second memories 12a, 12b. Alternatively, the information destined for first memory 12a can be stored in second memory 12b first (or computed there, if IC chip 10 is equipped with logic circuits 14) and then transferred to first memory 12a. Communication between IC card 10 and interface unit 19 may be with contact or without contact, for example through an RF antenna system. Most existing protocols, including ISO 7816, may be used for communication between IC card 10 and interface unit 19.

Plural parallel ports (outputs) 15 link first memory 12a with a liquid crystal display 16, one port per pixel of the latter. A local electrical energy source 17 powers IC chip 13 and liquid crystal display 16. In a preferred embodiment, local energy source powers 17 only first memory 12a. Alternatively, local electrical energy source 17 powers IC chip 13, but only first memory 12a is in the "read" mode, while the rest of IC chip 13 is in the stand-by mode. According to the state of each bit of information in first memory 12a (0 or 1), the corresponding pixels in liquid crystal display 16 will be powered on or not, thus causing a pattern to be displayed. Segregation of the displayed information in memory 12a prevents the information of second memory 12b from being corrupted accidentally.

It is to be understood that the terms "first" and "second" memories are used to identify which of the memory components in integrated circuit card 10 have a parallel port 15 connected thereto or not. There are no rigid numerical limitations on the (digital) size of memories 12a, 12b, but first memory 12a should have at least as many memory cells as there are parallel ports 15. First memory 12a may be separate from IC chip 13—i.e., a separate component on card 10 distinct from IC chip 13—or it may be integrated therewith. Further, where integrated, first memory 12a may be "dispersed" within second memory 12b or it may occupy a segregated block within IC chip 13.

Because the information content of first memory 12a is limited, very little power is required to drive the system. When IC card 10 is in communication with interface unit 19, interface unit can provide more power, driving the entire IC chip 13, and information on both first and second memories 12a, 12b can be addressed. Thus, an IC card of this invention permits substantial amounts of information to be stored, with key portions thereof always available for viewing by the bearer, even when the card is in its autonomous mode, i.e. not in communication with another device or an external power source. When the card is connected to interface unit 19, or is inserted into a separate reader unit (not shown) having more power, all the information stored in the IC card may be viewed on an appropriate display (liquid crystal, electrochromic, plasma, etc.) associated with interface unit 19 or the reader unit. Driving a liquid crystal display with conventional driver IC's requires significant electrical power. In the invention, driving liquid crystal display 16 via a memory chip alone (or a memory component alone of a logic-plus-memory chip) allows one to reduce drastically power consumption, thus enabling the use of a much smaller power source. Moreover, by bifurcating the total information stored and the information displayed in the autonomous mode, power consumption can be further reduced.

Besides requiring very little power, the present invention is advantageous in its simplicity. No separate driving circuit is required; rather, first memory 12a and liquid crystal display 16 are directly driven by electric energy source 17. The absence of a need to power a separate driving circuit also contributes to reduced power consumption. The minimal power requirements mean a wide range of electric energy sources 17 can be used with IC card 10, including power sources incompatible with IC cards not according to this invention. Such "local" power sources include piezoelectrically actuated energy sources, pyroelectric energy sources, batteries, and solar cells.

FIG. 2a shows the circuit diagram of an exemplary piezoelectric energy source 20 that can be used as an electric energy source 17, comprising a piezoelectric element 21, a rectifier 22, and a capacitor 23. Electric energy is generated by inputting mechanical work energy, for example by pressing down on a diaphragm made of piezoelectric material. Suitable piezoelectric elements 21 include piezoelectric diaphragms of the external drive/self drive type available from Murata Manufacturing Co., Ltd., of Kyoto, Japan (http://www.murata.co.jp/), for instance as a 25 mm disk of piezoelectric material on a brass disk (product no. VSB41D25-07AR0, 140 nF capacitance). Rectifier 22 may be a rectifier bridge such as Multicomp DB 103G. Capacitor 23 may be a 0.1 $\mu$F metallized polyester film capacitor (Philips, no. 222237011104). The rectifier 22/capacitor 23 combination serves to supply first memory 12a and liquid crystal display 16 with DC voltage. In an alternative embodiment, the rectifier bridge may be replaced by a single diode. In yet another alternative embodiment, capacitor 23 may be omitted. In yet another alternative embodiment, piezoelectric element 21 may be directly connected to first memory 12a, if the latter supports reverse polarity.

FIG. 2b illustrates an alternative electric energy source 17, in the form of a battery 25, which can be for example a lithium polymer battery or a button cell. In such instance, a switch 26 controls the driving (or not) of first memory 12a and liquid crystal display 16. Because of the low power requirements, a much smaller battery can be used, compared to other designs.

FIG. 2c shows yet another alternative electric energy source 17, in the form of a photovoltaic (solar) cell 27, also controlled by a switch 26. The latter is optional, because a photovoltaic cell, unlike a battery, is not susceptible to being drained.

Where electric energy source 17 is a pyroelectric cell, it may be based on certain piezoelectric materials that also display a pyroelectric effect or on thermocouples displaying a Seebeck effect.

As noted above, first memory 12a may be an EEPROM, for example product no. 84041P available from Xicor, Inc., Milpitas, Calif. or product no. 28C16A available from Microchip Technology, Inc., Chandler, Ariz.

One type of liquid crystal display for which the present invention is especially suitable employs a liquid crystal composite comprising plural volumes (or droplets) of liquid crystals contained (i.e., dispersed, encapsulated, or embedded) within a polymer matrix, as the electro-optically active material. Such composites have been referred to in the art alternatively as encapsulated liquid crystal material, nematic curvilinear aligned phase (NCAP) materials or as polymer dispersed liquid crystal (PDLC) materials. Exemplary disclosures include Fergason, U.S. Pat. No. 4,435,047 (1984); West et al., U.S. Pat. No. 4,685,771 (1987); Pearlman, U.S. Pat. No. 4,992,201 (1991); Andrews et al., U.S. Pat. No. 5,202,063 (1993); Kamath et al., U.S. Pat. No. 5,233,445 (1993); Reamey, U.S. Pat. No. 5,328,850 (1994); Reamey et al., U.S. Pat. No. 5,405,551 (1995); Wartenberg et al., U.S. Pat. No. 5,427,713 (1995); Reamey et al., U.S. Pat. No. 5,543,944 (1996); Havens et al., U.S. Pat. No. 5,585,947 (1996); Cao et al., U.S. Pat. No. 5,738,804

(1998); Raychem WO 96/19547 (1996); and Dainippon Ink, EP 0,313,053 (1989); the disclosures of which are incorporated herein by reference. Generally, such composites are light scattering and/or absorbing in the absence of a sufficient electric field (the field-off state), but are substantially light transmissive in the presence of such electric field (the field-on state). Displays made with encapsulated liquid crystal material are especially suitable for the present invention, because they are field-effect devices, consuming very low amounts of power. Also, they can be made by lamination between two pieces of plastic (as opposed to glass) substrates, so that they are flexible and rugged. A membrane switch can be integrated with the display, for example where the electric energy source is a battery.

However, other types of liquid crystal displays should be suitable, including twisted nematic (TN) displays. Generally, any type of liquid crystal display that is amenable to being driven directly and tolerates short term exposure to DC current may be used.

The foregoing detailed description of the invention includes passages that are chiefly or exclusively concerned with particular parts or aspects of the invention. It is to be understood that this is for clarity and convenience, that a particular feature may be relevant in more than just the passage in which it is disclosed, and that the disclosure herein includes all the appropriate combinations of information found in the different passages. Similarly, although the various figures and descriptions herein relate to specific embodiments of the invention, it is to be understood that where a specific feature is disclosed in the context of a particular figure or embodiment, such feature can also be used, to the extent appropriate, in the context of another figure or embodiment, in combination with another feature, or in the invention in general.

Further, while the present invention has been particularly described in terms of certain preferred embodiments, the invention is not limited to such preferred embodiments. Rather, the scope of the invention is defined by the appended claims.

What is claimed is:

1. An integrated circuit card, comprising:
   a. a card-shaped support;
   b. a reprogrammable nonvolatile first memory on the support, for storing information to be displayed;
   c. an integrated circuit chip on the support, comprising
      i. a reprogrammable nonvolatile second memory for storing additional information; and
      ii. a serial port on said support for interfacing the integrated circuit chip with an external controller device; and
   d. a liquid crystal display on the support, the liquid crystal display having plural pixels;
   e. plural parallel output ports directly connecting each pixel of the liquid crystal display to a corresponding bit of information stored in the first memory; and
   f. an electric energy source on the support connected directly to the first memory, solely for driving the first memory and the liquid crystal display via the first memory; wherein the optical state of each pixel corresponds directly to the state of the corresponding bit of information stored in the first memory upon driving the liquid crystal display.

2. An integrated circuit card according to claim 1, wherein the liquid crystal display comprises a liquid crystal composite as electrooptically active material.

3. An integrated circuit card according to claim 1, wherein the electric energy source is a piezoelectric energy source.

4. An integrated circuit card according to claim 1, wherein the electric energy source is a photovoltaic cell.

5. An integrated circuit card according to claim 1, wherein the electric energy source is a battery.

6. An integrated circuit card according to claim 1, wherein the electric energy source is a pyroelectric cell.

7. An integrated circuit according to claim 1, wherein the information to be displayed is redundantly stored in the second memory.

8. An integrated circuit card according to claim 1, wherein the information stored in the first and second memories is non-overlapping.

9. An integrated circuit card according to claim 1, wherein the first memory is an EEPROM.

10. An integrated circuit card according to claim 1, wherein the first memory is a flash memory.

11. An integrated circuit card according to claim 1, wherein the integrated circuit chip further comprises logic circuits.

12. An integrated circuit card according to claim 1, wherein the first memory is integrated with the integrated circuit chip.

13. An integrated circuit card according to claim 1, wherein the first memory is separate from the integrated circuit chip.

14. An integrated circuit card according to claim 2, wherein the electric energy source is a piezoelectric energy source.

15. An integrated circuit card according to claim 2, wherein the electric energy source is a photovoltaic cell.

16. An integrated circuit card according to claim 2, wherein the electric energy source is a battery.

17. An integrated circuit card according to claim 2, wherein the electric energy source is a pyroelectric cell.

18. An integrated circuit according to claim 2, wherein the information to be displayed is redundantly stored in the second memory.

19. An integrated circuit card according to claim 2, wherein the information stored in the first and second memories is non-overlapping.

20. An integrated circuit card according to claim 2, wherein the first memory is an EEPROM.

21. An integrated circuit card according to claim 2, wherein the first memory is a flash memory.

22. An integrated circuit card according to claim 2, wherein the integrated circuit chip further comprises logic circuits.

23. An integrated circuit card according to claim 2, wherein the first memory is integrated with the integrated circuit chip.

24. An integrated circuit card according to claim 2, wherein the first memory is separate from the integrated circuit chip.

25. An integrated circuit card, comprising:
a first memory including a plurality of memory locations, each memory location storing a display information bit;
an integrated circuit chip including a second memory for storing additional information and a serial port for interfacing with an external control device;
a display including a plurality of display elements having a plurality of optical states, each of the display elements directly connected to a distinct one of the memory locations of the first memory; and
an electrical energy source electrically connected directly to the first memory and to the display via the first memory for driving the first memory and the display only,
wherein upon activation of the electrical energy source the optical state of a particular display element is established based solely upon a value of the bit stored in the corresponding memory location.

26. An integrated circuit card, comprising:
a memory including a plurality of memory locations, each memory location storing a display information bit;
a display including a plurality of display elements having a plurality of optical states, each of the display elements connected directly to a distinct one of the memory locations of the memory; and
an electrical energy source electrically connected directly to the memory and to the display via the memory for driving the memory and the display only,
wherein activation of the electrical energy source establishes the optical state of each display element, based solely upon a value of the bit stored in the corresponding memory location.

* * * * *